(12) United States Patent
Wootton et al.

(10) Patent No.: US 11,800,319 B2
(45) Date of Patent: Oct. 24, 2023

(54) BUILDING SYSTEM CONTROL UTILIZING BUILDING OCCUPANCY

(71) Applicant: Ivani, LLC, Dardenne Praire, MO (US)

(72) Inventors: John Wootton, St. Louis, MO (US); Matthew Wootton, O'Fallon, MO (US); Justin McKinney, Wildwood, MO (US); Caitlin Riley, St. Louis, MO (US); Matthew Rush, St. Charles, MO (US); Boris Dieseldorff, St. Charles, MO (US); Achintya Kumar, St. Louis, MO (US); Christopher Nissman, Tucson, AZ (US)

(73) Assignee: Ivani, LLC, Chesterfield, MO (US)

( * ) Notice: Subject to any disclaimer, the term of this patent is extended or adjusted under 35 U.S.C. 154(b) by 0 days.

(21) Appl. No.: 17/145,796

(22) Filed: Jan. 11, 2021

(65) Prior Publication Data
US 2021/0136523 A1 May 6, 2021

Related U.S. Application Data

(63) Continuation of application No. 16/502,831, filed on Jul. 3, 2019, now Pat. No. 10,917,745, which is a
(Continued)

(51) Int. Cl.
H04W 24/00 (2009.01)
H04W 4/02 (2018.01)
(Continued)

(52) U.S. Cl.
CPC .............. *H04W 4/023* (2013.01); *G01V 3/12* (2013.01); *G06Q 50/10* (2013.01); *G08C 17/02* (2013.01);
(Continued)

(58) Field of Classification Search
CPC .......... G01J 5/0025; G01S 5/01; G01S 5/011; G01S 5/016; G01S 5/014; G01S 5/018;
(Continued)

(56) References Cited

U.S. PATENT DOCUMENTS 6,297,746 B1 * 10/2001 Nakazawa ............. G08C 17/02
340/505
8,502,666 B1 8/2013 Tam et al.
(Continued)

FOREIGN PATENT DOCUMENTS

CN 1625368 A 6/2005
CN 101013522 A 8/2007
(Continued)

OTHER PUBLICATIONS

Intellectual Property India, The Patent Office, Examination Report, dated Mar. 18, 2022, 7 pages.
(Continued)

*Primary Examiner* — Shantell L Heiber
(74) *Attorney, Agent, or Firm* — Lewis Rice LLC

(57) ABSTRACT

Systems and methods that can utilize the detection of human occupancy without fiducial elements to control an environmental, security, or other system within a structure. The systems and method can initiate communication to a human user directly, and can alter their operation based on human presence.

11 Claims, 11 Drawing Sheets

Related U.S. Application Data continuation of application No. 15/686,952, filed on Aug. 25, 2017, now Pat. No. 10,382,893, which is a continuation-in-part of application No. 15/600,380, filed on May 19, 2017, now Pat. No. 10,064,013, which is a continuation of application No. 15/227,717, filed on Aug. 3, 2016, now Pat. No. 9,693,195, which is a continuation of application No. 15/084,002, filed on Mar. 29, 2016, now Pat. No. 9,474,042.

(60) Provisional application No. 62/252,954, filed on Nov. 9, 2015, provisional application No. 62/219,457, filed on Sep. 16, 2015.

(51) Int. Cl.
| | |
|---|---|
| G08C 17/02 | (2006.01) |
| G06Q 50/10 | (2012.01) |
| H04Q 9/00 | (2006.01) |
| H04W 12/63 | (2021.01) |
| H04B 17/318 | (2015.01) |
| H04W 4/80 | (2018.01) |
| G01V 3/12 | (2006.01) |
| H04L 1/00 | (2006.01) |
| H04L 5/00 | (2006.01) |
| H04W 64/00 | (2009.01) |
| G07C 9/33 | (2020.01) |

(52) U.S. Cl.
CPC ......... *H04B 17/318* (2015.01); *H04L 1/0018* (2013.01); *H04L 5/006* (2013.01); *H04Q 9/00* (2013.01); *H04W 4/80* (2018.02); *H04W 12/63* (2021.01); *H04W 64/00* (2013.01); *G07C 9/33* (2020.01); *G08C 2201/60* (2013.01); *G08C 2201/91* (2013.01)

(58) Field of Classification Search
CPC ......... G01S 5/02; G01S 5/0244; H04W 4/02; H04W 4/029; H04W 64/00
See application file for complete search history.

(56) References Cited

U.S. PATENT DOCUMENTS

| | | | |
|---|---|---|---|
| 9,286,776 B1 | 3/2016 | Morton | |
| 9,474,042 B1 | 10/2016 | Wootton et al. | |
| 9,507,008 B1 | 11/2016 | Thiagarajan | |
| 9,693,195 B2 | 6/2017 | Wootton et al. | |
| 10,064,013 B2 | 8/2018 | Wootton et al. | |
| 10,064,014 B2 | 8/2018 | Wootton et al. | |
| 10,142,785 B2 | 11/2018 | Wootton et al. | |
| 2005/0055568 A1 | 3/2005 | Agrawala et al. | |
| 2007/0133487 A1 | 6/2007 | Wang et al. | |
| 2007/0286208 A1 | 12/2007 | Kanada et al. | |
| 2007/0290885 A1* | 12/2007 | Tanabe | G08C 23/04 398/112 |
| 2008/0062940 A1 | 3/2008 | Othmer et al. | |
| 2008/0214111 A1 | 9/2008 | Moshir et al. | |
| 2008/0318564 A1 | 12/2008 | Kreiner et al. | |
| 2009/0284245 A1 | 11/2009 | Kirby et al. | |
| 2010/0141437 A1 | 6/2010 | Karam et al. | |
| 2010/0265093 A1 | 10/2010 | Cho et al. | |
| 2010/0328492 A1 | 12/2010 | Fedorovskaya et al. | |
| 2011/0260871 A1* | 10/2011 | Karkowski | G08B 21/22 340/670 |
| 2012/0146788 A1* | 6/2012 | Wilson | G08B 13/187 340/539.23 |
| 2012/0310376 A1 | 12/2012 | Krumm et al. | |
| 2013/0167196 A1 | 6/2013 | Spencer et al. | |
| 2013/0285472 A1* | 10/2013 | Bull | H05B 39/085 307/116 |
| 2014/0087752 A1 | 3/2014 | Zhu et al. | |
| 2014/0312128 A1 | 10/2014 | Matsuoka et al. | |
| 2014/0317029 A1* | 10/2014 | Matsuoka | G05D 23/1919 706/12 |
| 2014/0330560 A1* | 11/2014 | Venkatesha | G06F 3/167 704/235 |
| 2015/0187192 A1 | 7/2015 | Tabe | |
| 2015/0195100 A1 | 7/2015 | Imes et al. | |
| 2015/0226447 A1* | 8/2015 | Muramatsu | F24F 3/065 62/157 |
| 2015/0282081 A1 | 10/2015 | Oren | |
| 2015/0301173 A1* | 10/2015 | Vangeel | G01S 15/04 315/158 |
| 2015/0344265 A1 | 12/2015 | Hakonen et al. | |
| 2015/0348007 A1 | 12/2015 | Khan et al. | |
| 2016/0021485 A1 | 1/2016 | Sallas et al. | |
| 2016/0054021 A1* | 2/2016 | Lee | G05B 15/02 700/276 |
| 2016/0100046 A1 | 4/2016 | Meru et al. | |
| 2016/0104365 A1* | 4/2016 | Henderson | G08B 21/22 340/686.6 |
| 2016/0105278 A1 | 4/2016 | Huang | |
| 2016/0127875 A1 | 5/2016 | Zampini, II | |
| 2016/0161339 A1 | 6/2016 | Tan | |
| 2016/0183059 A1 | 6/2016 | Nagy et al. | |
| 2016/0189532 A1 | 6/2016 | Malhotra et al. | |
| 2016/0195856 A1* | 7/2016 | Spero | H05B 47/155 700/90 |
| 2016/0261986 A1 | 9/2016 | Nord | |
| 2016/0337353 A1 | 11/2016 | Coats | |
| 2017/0024574 A1 | 1/2017 | Agrawal et al. | |
| 2017/0078845 A1 | 3/2017 | Wootton et al. | |
| 2017/0132888 A1* | 5/2017 | Conlon | G08B 29/188 |
| 2017/0366938 A1 | 12/2017 | Wootton et al. | |

FOREIGN PATENT DOCUMENTS

| | | |
|---|---|---|
| CN | 101346640 A | 1/2009 |
| CN | 101436336 A | 5/2009 |
| CN | 102223710 A | 10/2011 |
| CN | 102331302 A | 1/2012 |
| CN | 102883360 A | 1/2013 |
| CN | 103458413 A | 12/2013 |
| CN | 103596266 A | 2/2014 |
| CN | 104502982 A | 4/2015 |
| CN | 104835277 A | 8/2015 |
| CN | 106134269 A | 11/2016 |
| EP | 2924631 A1 | 9/2015 |
| EP | 3089128 A2 | 11/2016 |
| JP | H01162186 A | 6/1989 |
| JP | 2011186751 A | 9/2011 |
| JP | 2015098679 B2 | 5/2015 |
| JP | 2015527573 A | 9/2015 |
| JP | 2016090587 A | 5/2016 |
| JP | 2016206851 A1 | 12/2016 |
| KR | 20140025207 A | 3/2014 |
| RS | 20130027 A1 | 6/2014 |
| WO | 2012004420 A1 | 1/2012 |
| WO | 2016160376 A1 | 6/2016 |
| WO | 2017078811 A2 | 5/2017 |

OTHER PUBLICATIONS

China National Intellectual Property Administration, First Office Action and Search Report, dated Dec. 30, 2021, 3 pages.

European Search Report and Written Opinion for Application No. PCT/19US/014197, dated Sep. 1, 2021, 8 pages.

Gu, Yu, et al., "WiFi-Assisted Human Activity Recognition", 2014 IEEE Asia Pacific Conference on Wireless and Mobile, Bali, Indonesia, 2014, pp. 60-65.

Mrazovac, Bojan, et al., "Reaching The Next Level of INdoor Human PResence Detection: An RF Based Solution", 2013 11th International Conference on Telecommunications In Modem Satellite, Cable and Broadcasting Services (TELSIKS), Nis, Serbia, 2013, pp. 297-300.

Saeed, Ahmed, et al., "Ichnaea: A Low-Overhead Robust WLAN Device-Free Passive Localization System", Journal of Selected Topics In Signal Processing, Jan. 2013, pp. 1-11, vol. 99, No. 1.

(56) References Cited

OTHER PUBLICATIONS

Wilson, Joey, et al. "Radio Tomographic Imaging with Wireless Networks" IEEE Transactions on Mobile Computing, May 2010, pp. 621-632.

Kosba, Ahmed E. et al., "Robust WLAN Device-free Passive Motion Detection", 2012 IEE Wireless Communications and Networking Conference, 6 Pages.

Kosba, Ahmed, et al. "RASID: A Robust WLAN Defice-free Passive Motion Detection System", 2012 IEEE International Conference on Pervasive Computing and Communications, pp. 180-189.

\* cited by examiner

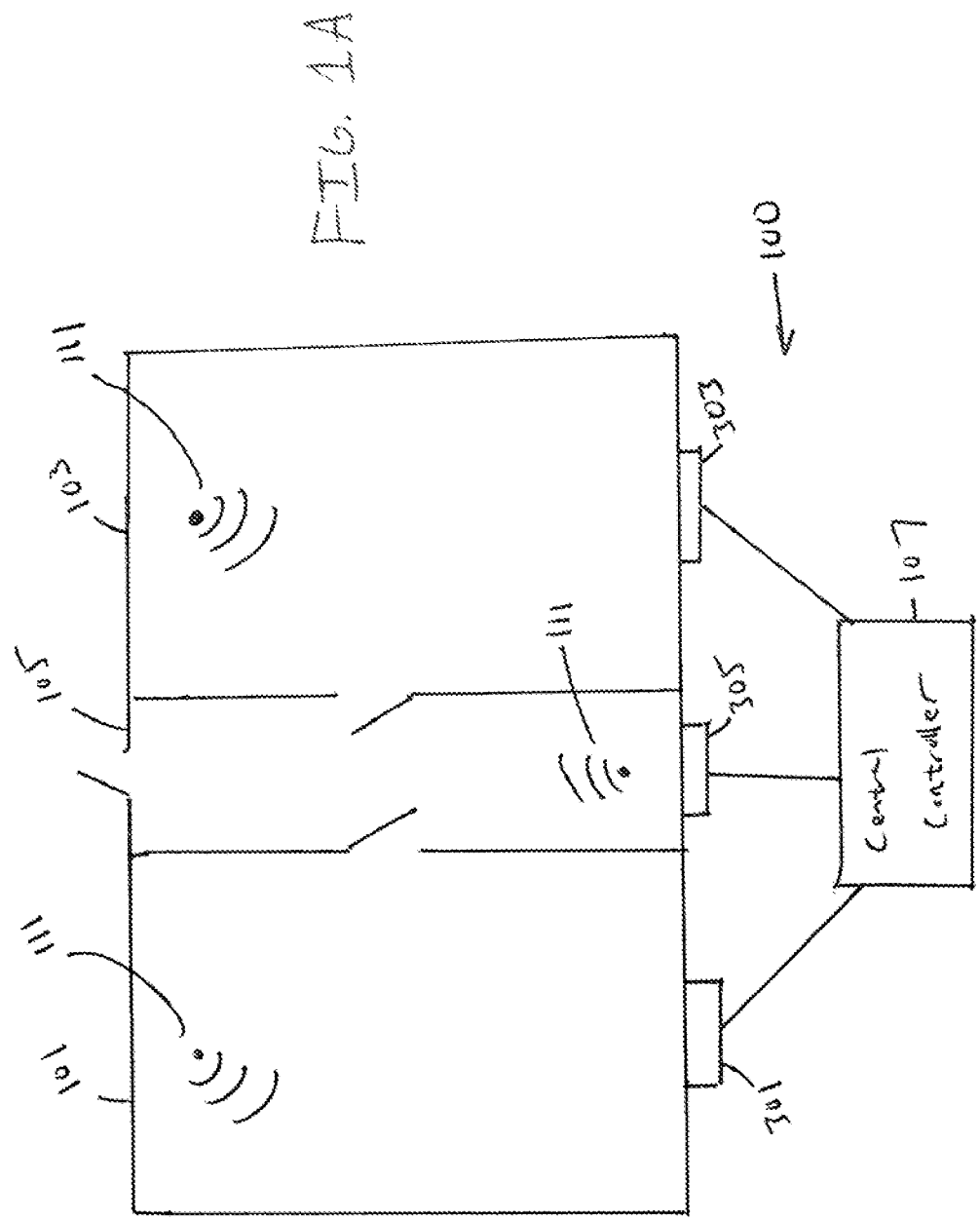

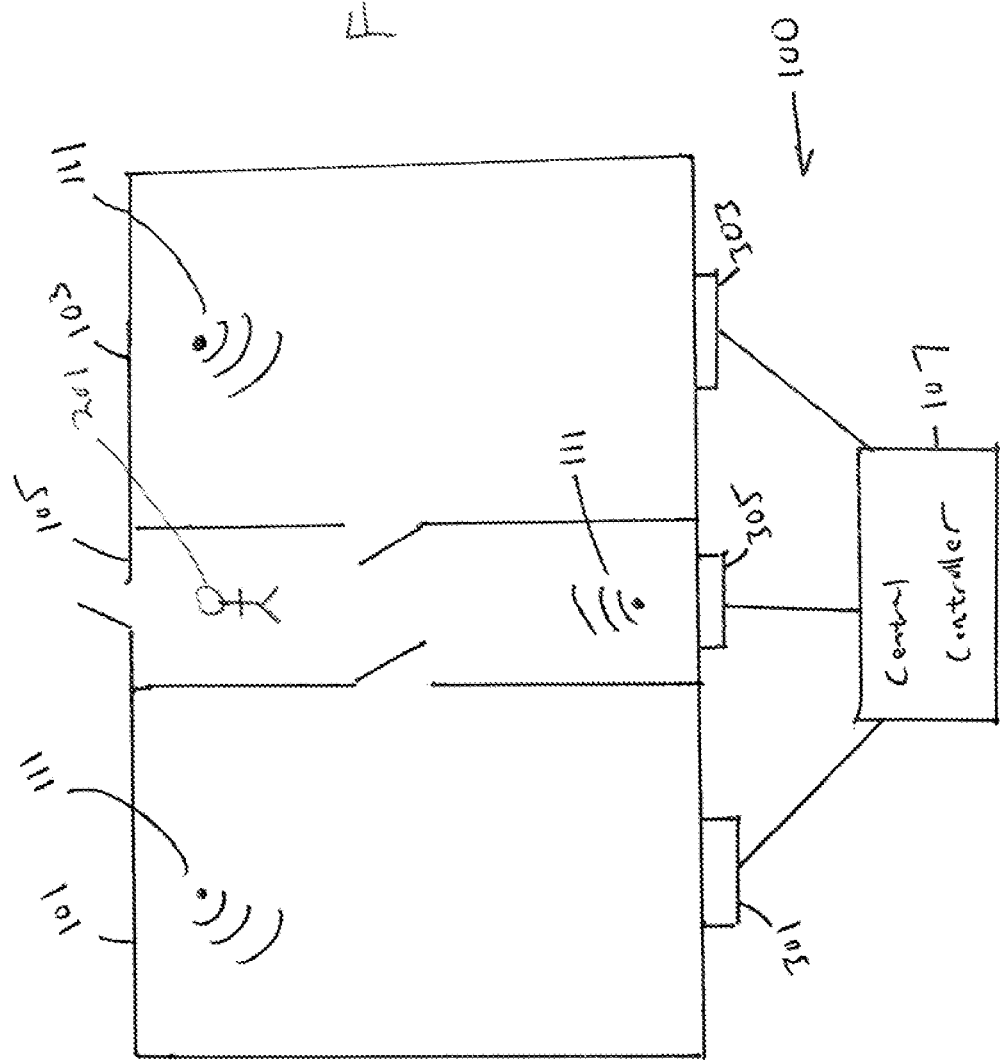

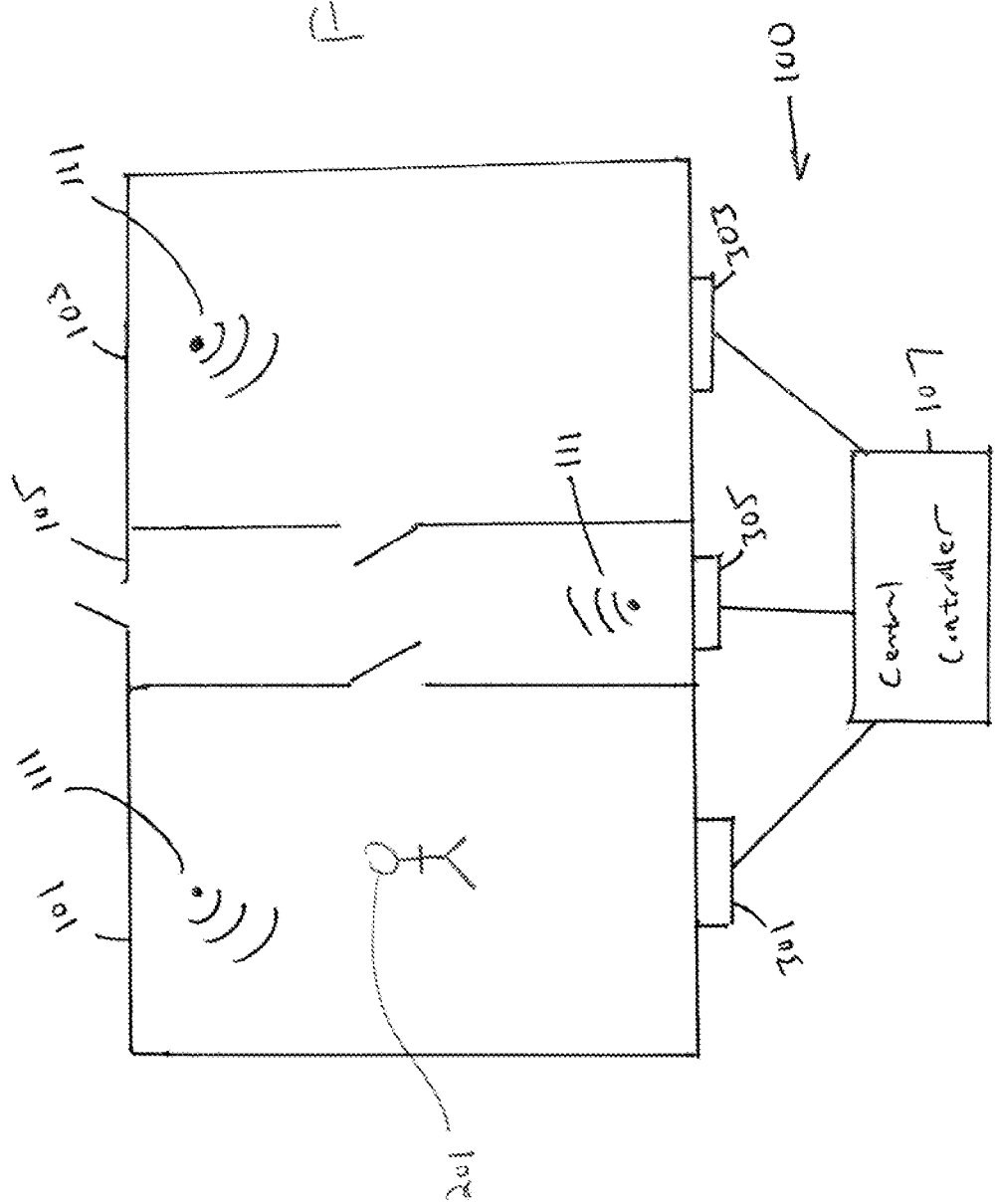

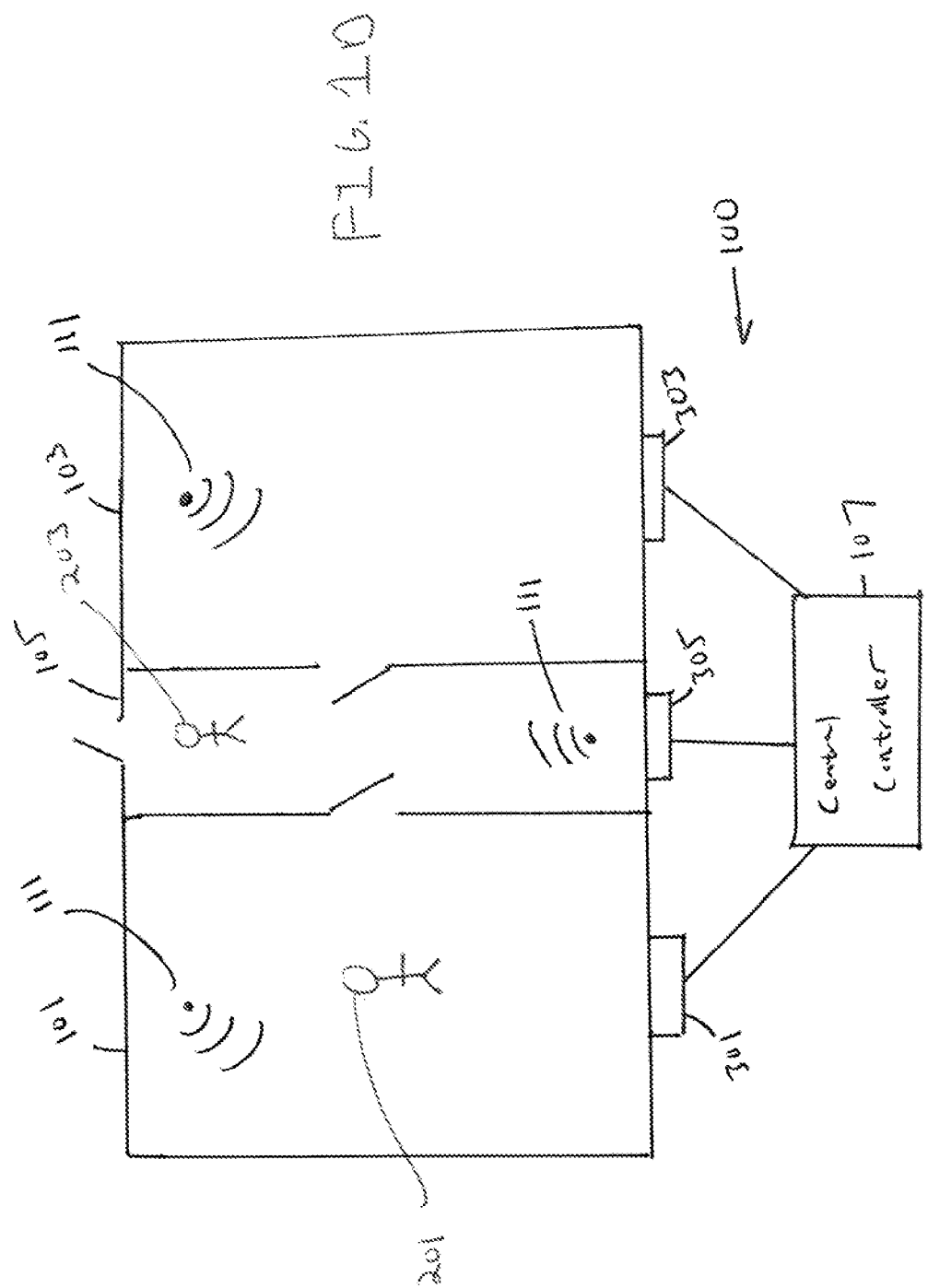

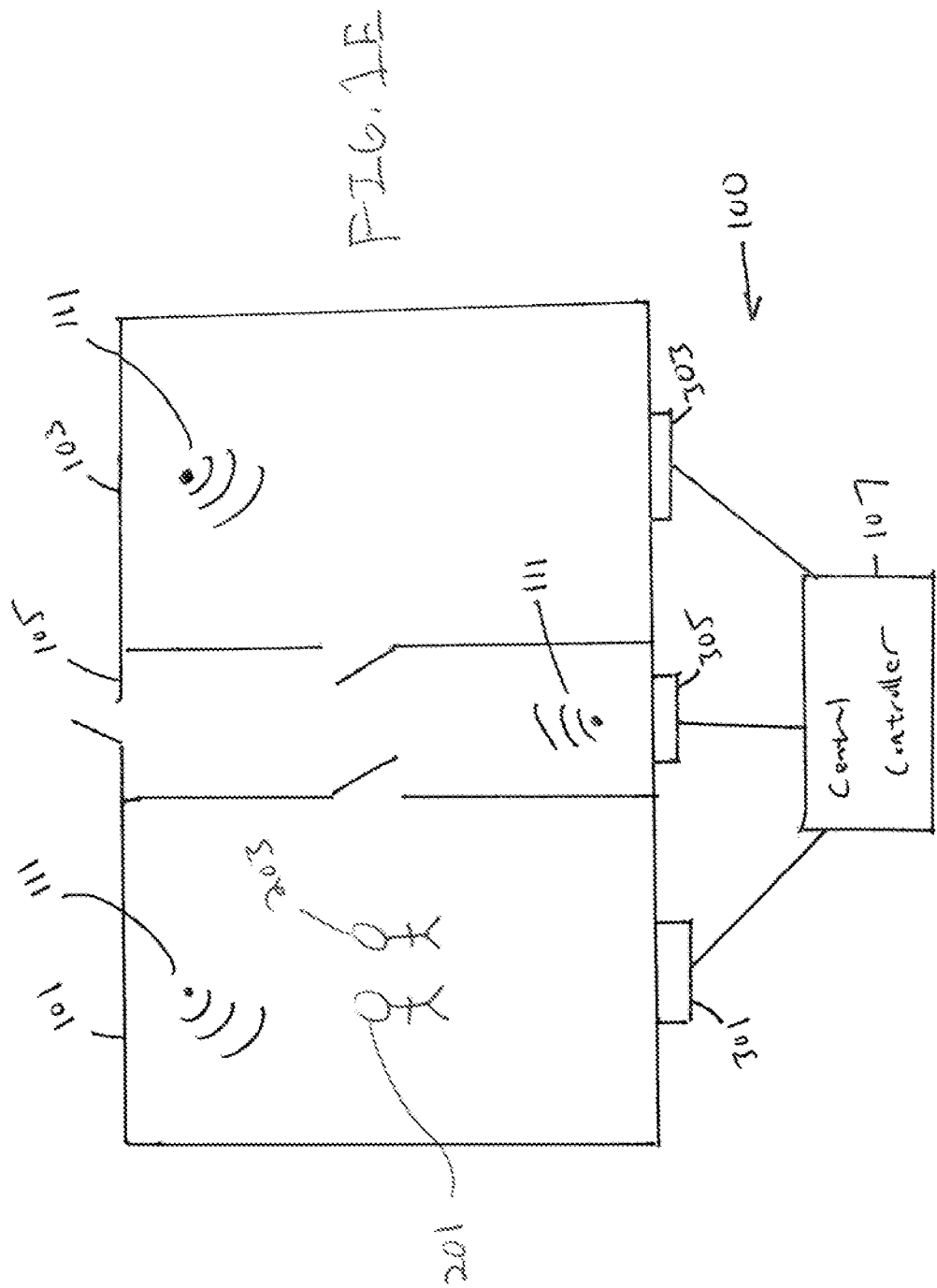

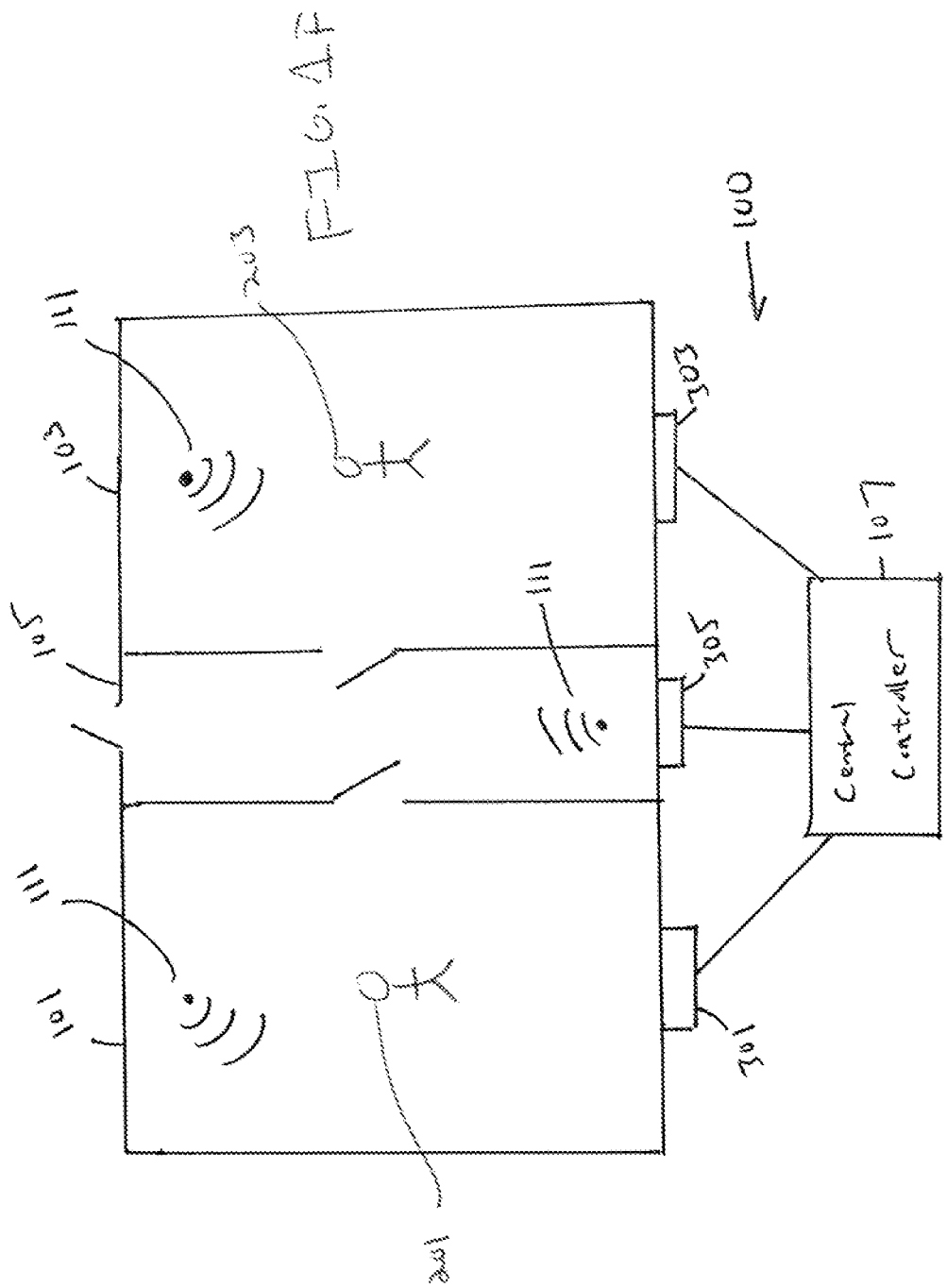

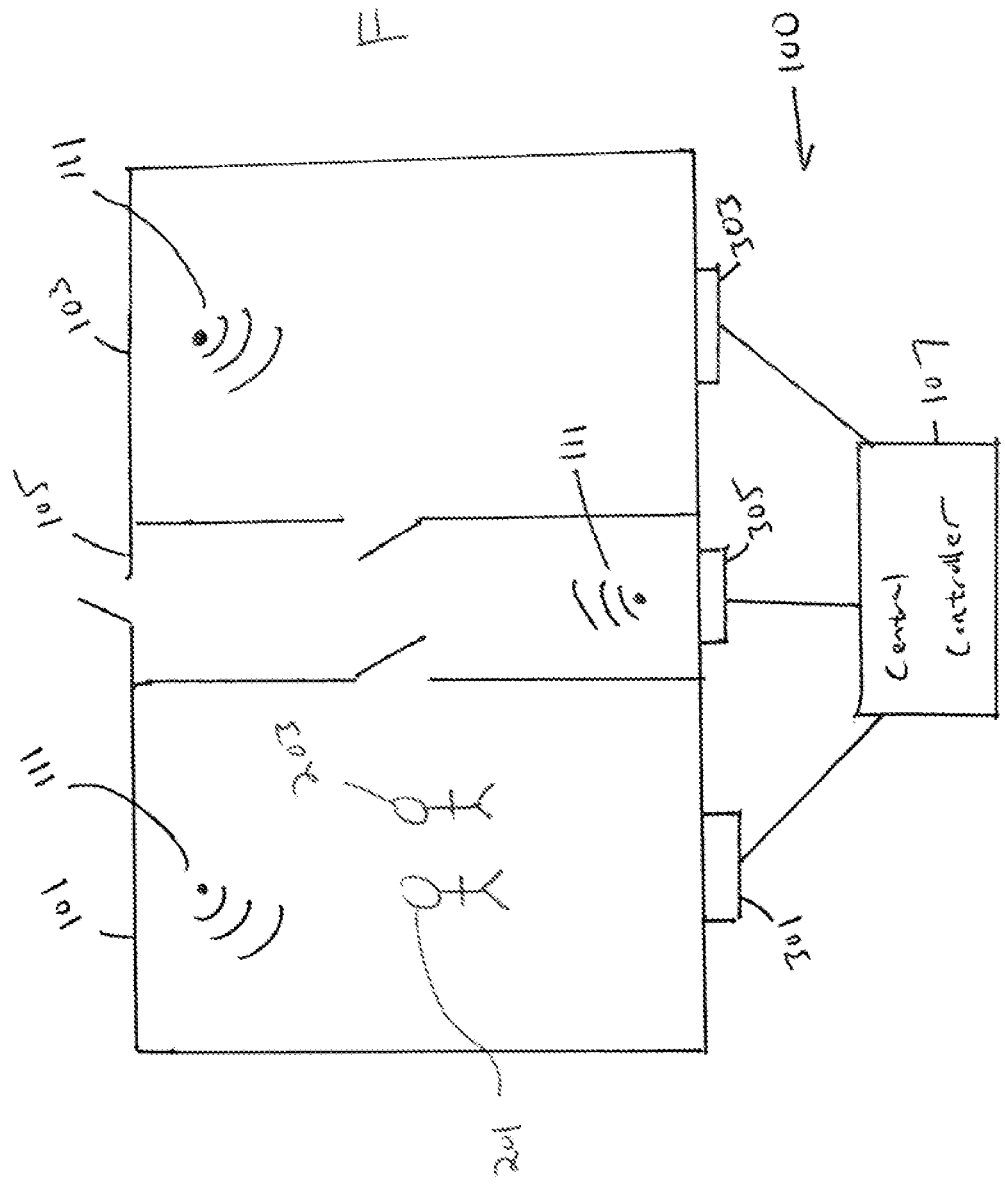

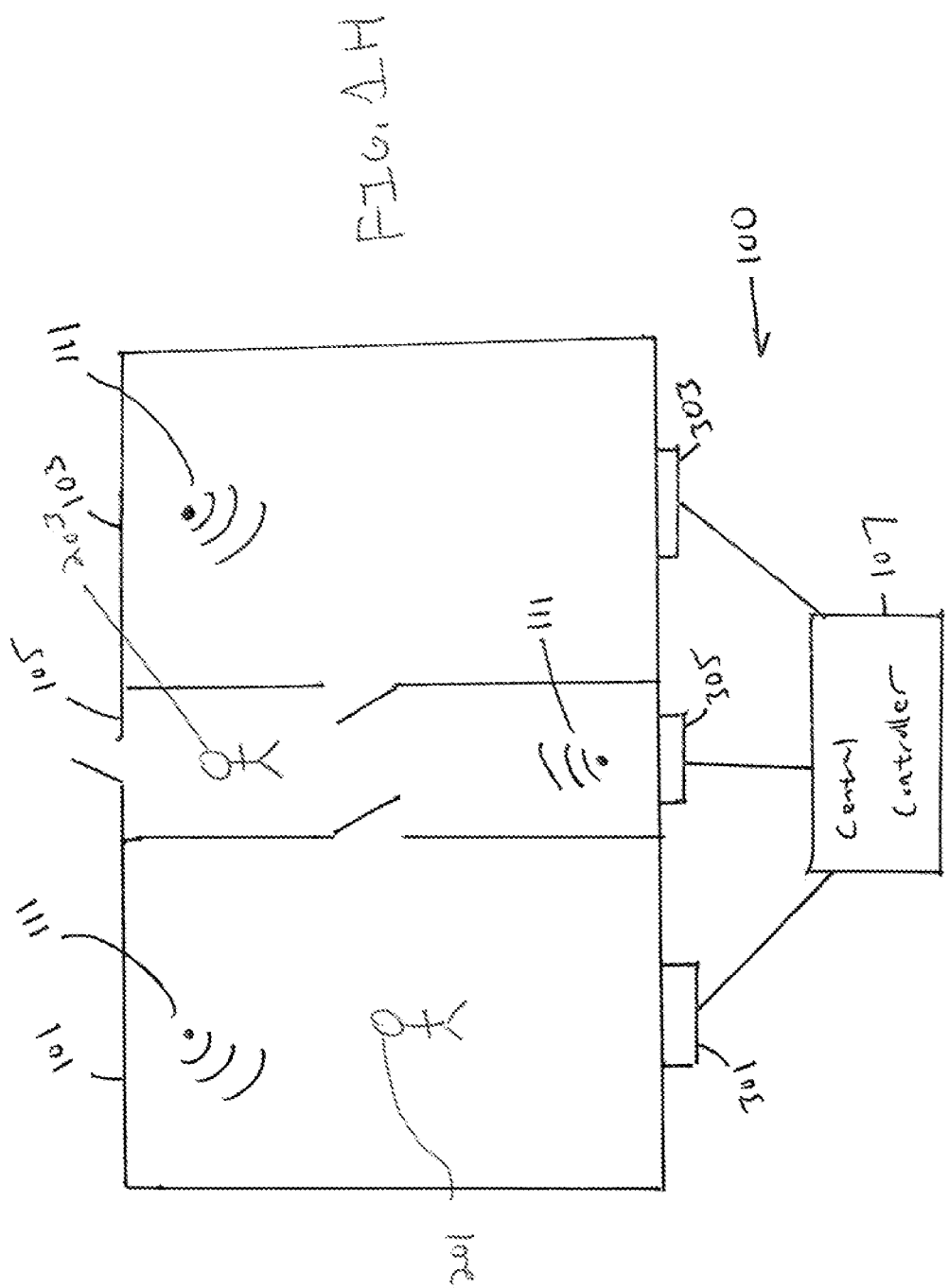

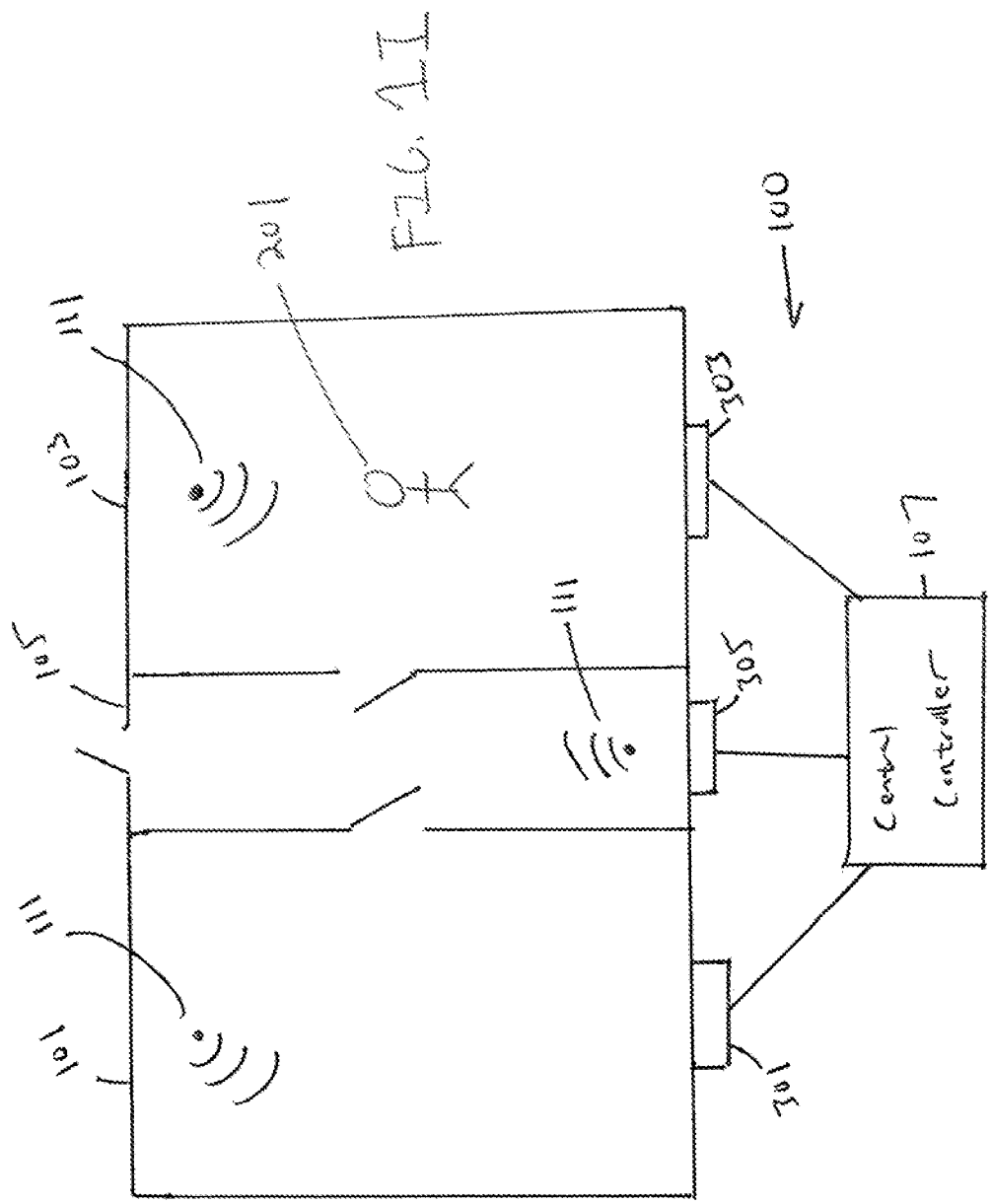

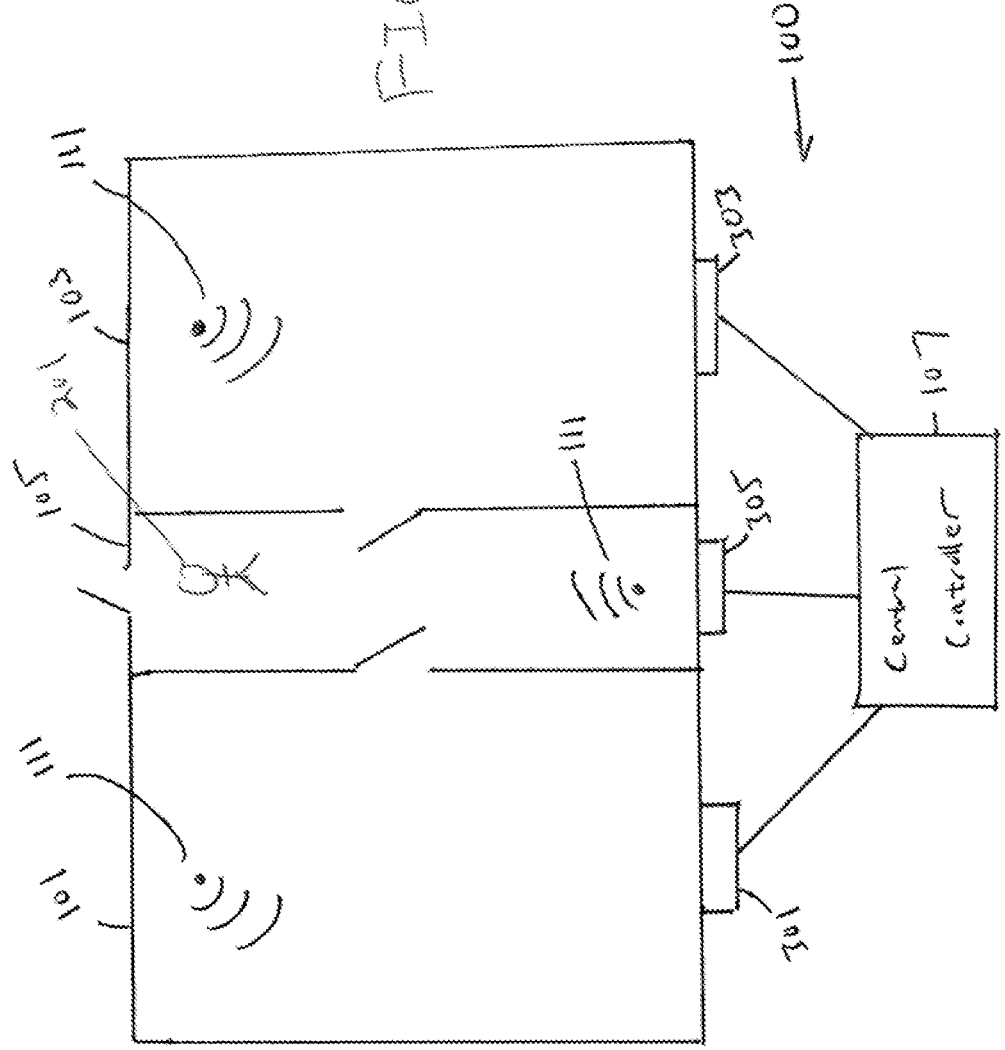

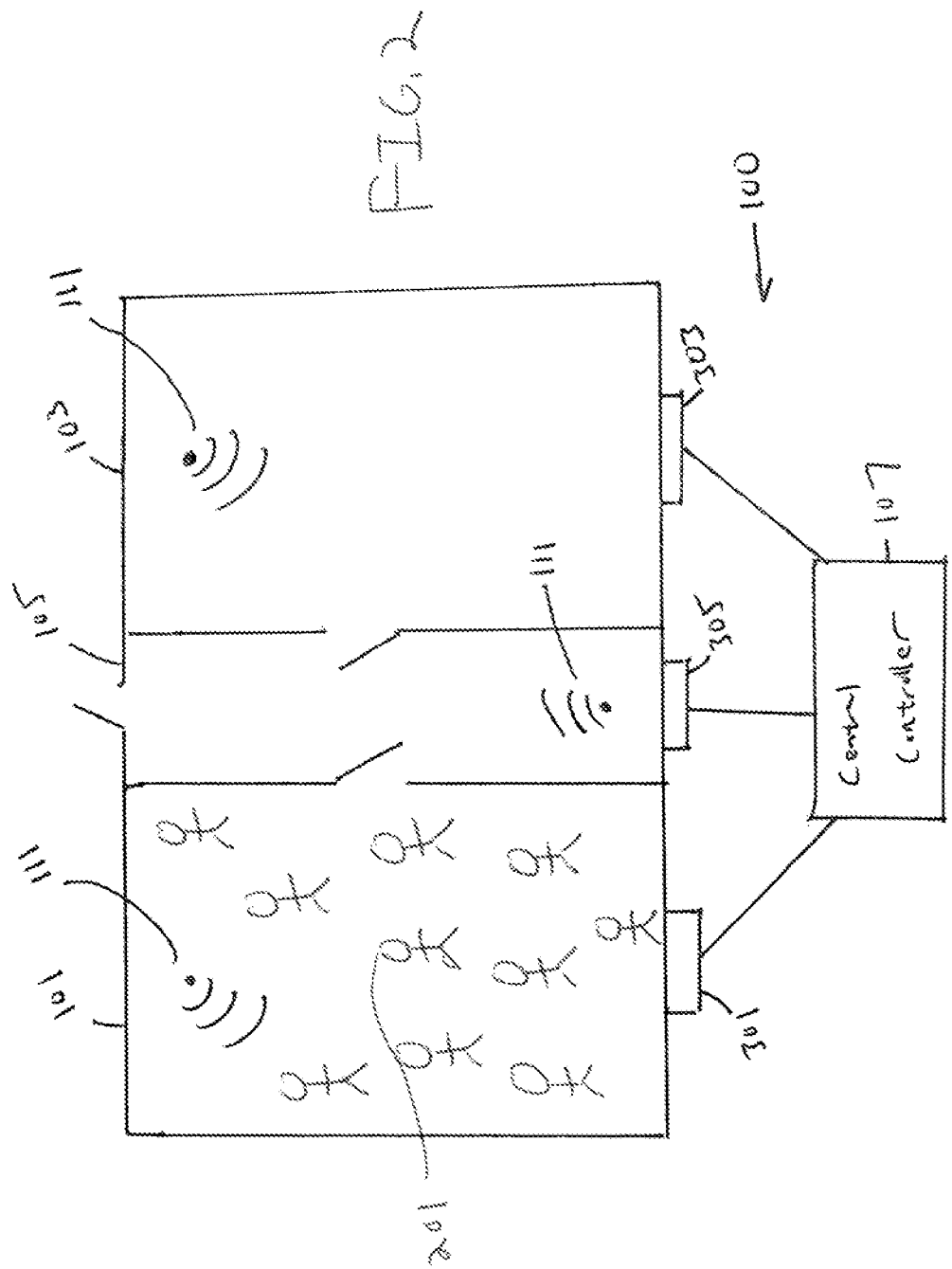

BUILDING SYSTEM CONTROL UTILIZING BUILDING OCCUPANCY

CROSS-REFERENCE TO RELATED APPLICATIONS

This application is a Continuation of U.S. Utility patent application Ser. No. 16/502,831 filed Jul. 3, 2019, which is a Continuation of U.S. Utility patent application Ser. No. 15/686,952 filed Aug. 25, 2017, which is a Continuation-In-Part (CIP) of U.S. Utility patent application Ser. No. 15/600,380, filed May 19, 2017, which is a Continuation of U.S. Utility patent application Ser. No. 15/227,717, filed Aug. 3, 2016 and now U.S. Pat. No. 9,693,195, which claims the benefit of U.S. Provisional Patent Application No. 62/252,954, filed Nov. 9, 2015, and U.S. Provisional Patent Application No. 62/219,457, filed Sep. 16, 2015 and which is a Continuation of U.S. Utility patent application Ser. No. 15/084,002, filed Mar. 29, 2016 and now U.S. Pat. No. 9,474,042, which application, in turn, also claims benefit of U.S. Provisional Patent Application No. 62/252,954, filed Nov. 9, 2015, and U.S. Provisional Patent Application No. 62/219,457, filed Sep. 16, 2015. The entire disclosure of all of the above documents is herein incorporated by reference.

BACKGROUND

1. Field of the Invention

This disclosure is related to the field of localized control, and more particularly to systems and methods which allow for localized control of systems for a building or structure based on the determination of the presence of humans within the structure without the use of fiducial elements representing the user.

2. Description of the Related Art

The rise of the Internet of Things (IoT), which generally refers to the inclusion of "smart" devices into everyday objects, has led to rapid growth in the area of automation technologies for the home or office. The thermostat can now control temperature based on when it expects the user to be home and lights can be turned on and off remotely.

A problem with home and office automation and integration of IoT devices into living spaces, however, is that they require a human/machine "interface" to allow the human and machine to communicate. The interface is effectively a device to act as a translator between human and machine. The interface, in most cases, is a smartphone or other general-purpose computing device. Additionally, since the interactions occur through the smartphone, the smartphone is also often used by the systems as a fiducial element, an easy to identify "marker" representing the human user.

While the average human spends almost one-third of their time on their smartphone (as much as they spend sleeping in many cases), it is not really an ideal device to use to control their home or to control systems within a structure. It is also not ideal to use any device as a fiducial element to represent the human user to the system. However, because humans have not been able to effectively interface directly with machines, there has been a need in the industry to have some form of interface between the human user and the IoT devices that make up home automation systems and to identify humans using a fiducial element. Thus, with the proliferation of smartphones and similar devices that are with humans a large percentage of the time, the smartphone has become a default interface precisely because it works so well as a fiducial element (due to it being commonly carried on the human's person). To attempt to make home automation and other IoT devices more accessible to a human user and to decrease screen time and smartphone use, recent technology has tried to replace the smartphone with translator systems that are not carried on the person.

Voice recognition systems, or voice gateways, are currently used alongside other IoT devices to provide users the ability to command their devices to perform certain functions with spoken (or other similar) commands instead of having to utilize interfaces which require tactile manipulation such as screen based devices like smartphones which generally have to be on the user's person. As such, voice gateways provide for a very intuitive more remote interaction between the person with their home do not have to be carried with the person. The user simply asks the voice recognition unit to do something. The voice gateway "hears" this request and responds by sending instructions to the appropriately interconnected system to do it. This technology has been proliferated by the likes of Amazon (with Alexa), Google (with Google Home), Apple (with Siri), and Microsoft (with Cortana) to attempt to make human/machine interaction more natural.

One glaring problem with these systems, however, is that the interaction and translation is only one-way with the voice control system receiving instructions and sending machine-formatted commands to the IoT devices and speaking to a human user in the form of a response only. To initiate communication, electronic systems have still typically required a translator carried on the person. This has traditionally still been the user's smartphone even when voice response systems are available.

The need for the artificial interface carried on the person arises primarily because non-human systems have previously been unable to locate humans and to differentiate humans from other "things" within a space or from each other. Basically, an interaction system, such as a voice response system, that is not carried on the person does not know if a user is home until the user tells the interaction system they are home, and that is usually done via a command to do something, or until a fiducial element "proxy" for the user is detected in the space.

It should be apparent that in current human/machine interaction, the human is forced to have a fiducial element representative of them to allow for the system to initiate communication with the human user. Further, as the human needs to be able to respond to the machine should the machine contact the fiducial element, the fiducial element effectively needs to act as the translator for them. Thus, while voice response systems and other human/machine communication systems that are not carried on the person provide for an alternative communication method, they are effectively redundant to a fiducial element communication system which is still required for effective machine initiated communication.

Thus, the human/machine communication becomes limited by requiring the machine to initiate communication with a human by initiating communication to the fiducial element acting as a "proxy" for the human. Even if the communication does not go through the fiducial element, the fiducial element is necessary to be that "proxy" to allow the human to be located. This creates a major problem as the system cannot act based on the presence of humans, it can only react based on the presence of human proxies and that has severely limited the types and capabilities of systems that interact with humans.

There has been some attempts to eliminate the problem of needing a proxy and detect human presence generally through the use of motion detectors. The problem with these systems is that they are generally effective at determining when there is or is not some human presence, but are generally unable to detect a level of human presence. For example, a motion detector in a house can determine that someone is in the house, (so long as they have walked within its sensing area) but it cannot determine who is in the house, how many people are in the house, or why they are in the house. Thus, a motion detector controlling a thermostat, for example, can only turn environmental systems on and off, it cannot alter temperature based on how many people are home, which people are home, or if there is some other factor related to the building occupancy. For this, the system has required a human proxy.

To the extent that a machine relies upon talking to the interface as a "proxy" to talking with the human user, someone who wishes to pose as the human user simply needs to obtain this interface to do so and this creates a security risk. To deal with this problem, the solution has typically been to institute security systems on the fiducial element to make it only active (or allow it to carry out certain actions) when it has been linked to the correct human user. Unlocking screens and all forms of passwords or other remembered patterns that are integrated into smartphones are designed to make sure that the human using the device is the human who is supposed to be.

These systems, however, all have the same problem. If the connection between the fiducial element and the human user can be falsified, other machines will mistake the fiducial element as representative of the correct human user even though it is not. The problem of identity theft primarily exists because of precisely this problem and is becoming more prevalent because of the increasing reliance of human proxies. Further, a human user lacking the fiducial element is generally missed by a machine system that is reliant on them. Machines have typically been very good at identifying specific machines, but not very good and identifying humans, while humans generally have the opposite condition. Thus, systems which utilize smartphones as proxies for humans are effective at estimating that there is some human presence, but are ineffective for situations where a binary yes/no is problematic. For example, such systems are typically terrible at identifying the presence of small children as such children rarely have smartphones.

The general problem is that a traditional machine system must make one assumption. The assumption is that the authorized user is in proximity to the fiducial element which is the translator. It then uses the assumption of that proximity to position the user in space based on the position of the fiducial element and provides communication via the translator, instead of directly to the system. If this assumption is true, then the system can react to individuals.

This assumption, however, is much like a "you are here" sign. The sign actually tells the user the sign's location, which, because the user is proximate the sign in order to read it, it also generally is the user's position. However, as is a common source of comedy, moving the sign or viewing it in a non-proximate fashion makes it make no sense. Thus, user's have been forced to accept machine controlled systems that can only react in a binary on-off fashion, or are forced to utilize an electronic proxy on their person.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, it is desirable to allow for human/machine interaction without reliance on a fiducial element acting as a proxy for a human and needing to act as the point of contact for machine initiated communication. Instead, the systems and methods discussed herein provide for control by allowing a machine to use detected human occupancy of a building to initiate communication to a user or alter systems.

This improved effectiveness allows for machine systems which can operate in ways that proxy systems cannot. Specifically, they can react to human occupancy.

Described herein, among other things, is a system and method for controlling a system based on occupancy of a structure, the method comprising: locating a first human in a first space within a structure by detecting the first human's presence in the first space, the first human's detected location not corresponding to the location of a fiducial element carried by the first human acting as a proxy for the first human; locating a second human in the first space within a structure by detecting the second human's presence in the first space, the second human's detected location not corresponding to the location of a fiducial element carried by the second human acting as a proxy for the second human; instructing a system to take a first action based on the first human's and the second human's location in the first space; tracking movement of the first human from the first space to a second space within the structure the tracking not corresponding to tracking the location of a fiducial element carried by the first human acting as a proxy for the first human; determining that the second human's location is still in the first space, the determining not corresponding to locating a fiducial element carried by the second human acting as a proxy for the second human; and altering the instruction based on the first human being in the second space and the second human being in the first space.

In an embodiment of this method, the controlled system is an environmental control system of the structure.

In an embodiment of this method, the instruction comprises instructing the environmental control system to alter an environment within the first space without instructing the environmental control system to alter an environment in the second space.

In an embodiment of this method, the altering of the instruction comprises instructing the environmental control system to alter an environment within the second space without instructing the environmental control system to further alter the environment in the first space.

In an embodiment of this method, upon the first human entering the second space, a voice response system issues a query audible in the second space but not in the first space.

In an embodiment of this method, the altering of instruction only occurs if the first human and not the second human responds to the query.

In an embodiment, this method further comprises tracking movement of the first human from the second space to the first space within the structure the tracking not corresponding to tracking the location of a fiducial element carried by the first human acting as a proxy for the first human; determining that the second human's location is still in the first space, the determining not corresponding to locating a fiducial element carried by the second human acting as a proxy for the second human; and altering the instruction based on the first human returning to the first space and the second human remaining in the first space.

In an embodiment of this method, the instruction is altered by the first human returning to the first space to the instruction before the instruction was altered by the first human being in the second space.

In an embodiment of this method, the instruction is altered only after the first human has remained in the second space for a predetermined period of time.

In an embodiment of this method, the controlled system comprises a security system wherein said security system indicates an intrusion into said first space or said second space by a third human different from said first human or said second human.

There is also described herein a system and method for controlling a system based on occupancy of a structure, the method comprising: locating a first human in a first space within a structure by detecting the first human's presence in the first space, the first human's detected location not corresponding to the location of a fiducial element carried by the first human acting as a proxy for the first human; locating a second human in a second space within a structure by detecting the second human's presence in the second space, the second human's detected location not corresponding to the location of a fiducial element carried by the second human acting as a proxy for the second human; instructing a system to take a first action based on the first human's location in the first space and the second human's location in the second space; tracking movement of the first human from the first space to the second space the tracking not corresponding to tracking the location of a fiducial element carried by the first human acting as a proxy for the first human; determining that the second human's location is still in the second space, the determining not corresponding to locating a fiducial element carried by the second human acting as a proxy for the second human; and altering the instruction based on the first human being in the second space and the second human being in the second space.

In an embodiment of the above method, the controlled system is an environmental control system of the structure.

In an embodiment of the above method, the instruction comprises instructing the environmental control system to alter an environment within the first space and instructing the environmental control system to alter an environment in the second space.

In an embodiment of the above method, the altering of the instruction comprises instructing the environmental control system to alter an environment within the second space and sending additionally instructing the environmental control system to alter the environment in the first space.

In an embodiment of the above method, upon the first human entering the second space, a voice response system issues a query audible in the second space but not in the first space.

In an embodiment of the above method, the altering of instruction only occurs if the second human and not the first human responds to the query.

In an embodiment, the above method further comprises tracking movement of the first human from the second space to the first space within the structure the tracking not corresponding to tracking the location of a fiducial element carried by the first human acting as a proxy for the first human; determining that the second human's location is still in the second space, the determining not corresponding to locating a fiducial element carried by the second human acting as a proxy for the second human; and altering the instruction based on the first human returning to the first space and the second human remaining in the second space.

In an embodiment of the above method, the instruction is altered by the first human returning to the first space to the instruction before the instruction was altered by the first human moving into the second space.

In an embodiment of the above method, the instruction is altered only after the first human has remained in the second space for a predetermined period of time.

In an embodiment of the above method, the controlled system comprises a security system wherein said security system indicates an intrusion into said first space or said second space by a third human different from said first human or said second human.

BRIEF DESCRIPTION OF THE DRAWINGS

FIGS. 1A through 1J show operation of the system at a variety of discrete times each representing a different scenario based on human occupation.

FIG. 2 shows a specific occupation scenario involving a large number of individual humans.

DESCRIPTION OF THE PREFERRED EMBODIMENT

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Generally speaking, described herein, among other things, are systems and methods which allow for IoT systems, such as those used for home or other building automation, to initiate communication, or make decisions as to operation, by using detected presence of a human in a network without fiducial elements. Basically, the systems and methods utilize various technologies to detect that a human, humans, or a particular human user are currently occupying a space, as opposed to detecting a fiducial element representing the human is in the space, and these allow the system to proactively initiate communication or take specific actions based on that presence. As such, the present systems provide for a much more reactive experience and eliminate the on/off binary response previously available.

The systems and methods discussed herein need to utilize detection systems which do not require or use a fiducial element as a proxy to "detect" a human user and do not require a human user to initiate communication. By this it is meant that the detection methods and systems used by the systems herein have to detect that there is a presence in a defined space (e.g. a room of a building) which is determined to be a human (or a particular human) through an action other than detecting an electronic device which the human is expected to be carrying or to have with them and other than the human self-identifying themselves to the machine.

These detection systems are referred to as Network Presence Sensing (or NPS) systems herein. The primary NPS systems and methods for doing this herein are preferably those described in U.S. patent application Ser. Nos. 15/600, 380 and 15/227,717, the entire disclosures of which are herein incorporated by reference, and this type of detection system will be used throughout the examples of this disclosure. However, one of ordinary skill will understand that other systems and methods can be used to detect the presence of a human, or a particular human, to which the system can proactively initiate communication or action based on that presence.

A key aspect of NPS systems of the type contemplated for use herein is their granularity. As discussed in the above referenced patent documents, it is important that an NPS system detect an actual human, not a fiducial element which is used to proxy a human. A further element is that the NPS system be able to differentiate the presence of multiple humans from the presence of a single human. In effect, an NPS system of use in the present systems and methods needs to know where any human is within its sensing area and if a human is or is not within the sensing area. Traditional systems based on "sensing" humans (e.g. motion detectors) are not able to do this as they cannot differentiate signals and simply can tell only if at least one human (or something thought to be human) is present.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist-wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth™ and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

Throughout this disclosure, the term "detection network" refers to a wireless network used in the systems and methods of the present disclosure to detect the presence of biological mass interposed within the communications area of the network. A detection network may use general networking protocols and standards and may be, but is not necessarily, a special-purpose network. That is, while the nodes in the network could be deployed for the specific purpose of setting up a wireless detection network according to the present invention, they need not be and generally will not be. Ordinary wireless networks established for other purposes may be used to implement the systems and methods described herein. In an embodiment, the detection network uses a plurality of Bluetooth™ Low Energy nodes, but the present disclosure is not limited to such nodes. Each node acts as a computer with an appropriate transmitter and receiver for communicating over the network. Each of the computers provides a unique identifier within the network whenever transmitting a message such that a receiving computer is capable of discerning from where the message originated. Such message origination information will usually be critical to the functioning of the invention as described in this detailed description. The receiving computer then analyzes the incoming signal properties, including but not limited to, signal strength, bit error rate, and message delay. The detection network may be a mesh network, which means a network topology in which each node relays data from the network.

Throughout this disclosure, the term "node" refers to a start point or endpoint for a network communication, generally a device having a wireless transceiver and being a part of a detection network. Nodes are generally standalone, self-contained networking devices, such as wireless routers, wireless access points, short-range beacons, and so forth. A node may be a general-purpose device or a special-purpose device configured for use in a detection network as described herein. By way of example and not limitation, a node may be a device having the wireless transmission capabilities of an off-the-shelf wireless networking device with the addition of specialized hardware, circuitry, componentry, or programming for implementing the systems and methods described herein; that is, for detecting significant changes to signal properties, including but not limited to, signal strength, bit error rate, and message delay. Within a detection network, each node can act as both a transmitter of signal to the network, as well as a receiver for other nodes to push information. In the preferred embodiment, the nodes utilize Bluetooth™ Low Energy (BLE) as a wireless networking system.

Throughout this disclosure, the terms "space" and "detection area" refer to an area created by two or more nodes inside of which a human may be detected using Network Presence Sensing technology. Generally, such terms refer to well defined spaces such as rooms in a dwelling; however, the definition is not limited to such configurations. A given "space" or "detection area" exists anywhere that two or more nodes are configured to operate in accordance with the invention described herein. Such "spaces" or "detection areas" may exist as a subset of a room, an entire room, multiple rooms, multiple parts of rooms, entire floors, entire buildings, and any other spatial configuration possible given combinations of two or more nodes.

The present disclosure primarily detects a human user(s) using Network Presence Sensing (NPS) technology such as that contemplated in U.S. patent application Ser. Nos. 15/600,380 and 15/227,717 the entire disclosures of which are herein incorporated by reference. In these technologies, it is possible to detect the presence of an individual human and, thus, a specific number of humans, in a detection area created by a series of nodes. This detection capability provides an important sensing input to automation systems of the present case to determine location of any human. As is discussed in the above referenced applications this detection of occupancy is performed without fiducial elements being required and without the need of the human user to self-identify. The human user is identified as being in a space simply by them being there.

In the present case, it should be recognized that the term "occupation" in association with presence in a structure simply requires the human to be present in an area and does not imply that they specifically live, work, reside, or intend to stay there. Instead it requires the human user to simply be in a specific known area where the system controls something at a time the system wishes to know if humans are in that area. To put this another way "occupation" is used herein to indicate that the human's location is generally known without the human user's position being assumed based on their proximity to a fiducial element associated with them and that known position places them generally in an area that the system controls some factor of. This factor will often relate to environmental or security features of the space as these are often the most dependent on specific human identification to implement in an effective manner.

With regards to environmental controls, most environmental controls are intended to improve the livability of an area for human users and maintaining such improved livability is often one of the primary expenses of a space. As such, there is a benefit to knowing when there are humans present in an area where the environment can be controlled and how many humans are present as an increased human occupancy generally results in warming of the area (due to the fact that humans give off heat) and often an increased need for air circulation and ventilation (due to human respiration).

To put it simply, temperature control, artificial light, and ventilation are generally most wasteful in areas that humans only occasionally occupy. While it is specifically wasteful to operate environmental controls when no humans are occupying a space, environmental controls include a lead up and down time and much of the waste actually occurs if there is an inaccurate transition based on occupancy which doesn't materialize. If human occupation in a space is permanent, maintaining constant environmental control for human benefit is efficient. However, if spaces are only occasionally occupied or occupied in different amounts at different times, providing environmental control when there is no one there is unnecessary and costs can be saved if the space can determine how many people are present, and "intuit" what type of load that presents for the system both currently, and in the future based on their expected occupancy.

FIGS. 1A through 1J provide for a general indication of how an environmental control system of the present disclosure can operate. The system (100) in these FIGS. comprises a multi-room structure with two rooms (101) and (103) and a hallway (105) with the exterior door therein. The two rooms (101) and (103) provided herein have individual environmental controls (301) and (303) and therefore can have their temperature controlled individually and are intended to be indicative of individual offices in an office building. The hall (105) also has an environmental control system (305). The system (100) further includes a central controller (107). The central controller (107) will generally comprise a computer running appropriate software, or a hard-wired computer system, which is interconnected to the detection network (111) for detecting individual humans and the environmental systems (301) and (303). This may be via a network or by other forms of communication. The central controller (107) may be onsite at the structure, or may be remote.

In the first time period, both rooms (101) and (103) are empty as shown in FIG. 1A and no humans are detected by the detection network (111). With regards to the present systems and methods, the detection network (111) can provide the detection of no presence which indication will result in the central controller (107) turning the environmental systems (301) and (303) off. Further, this particular scenario may involve arrangements such as arming the system (100).

At a later time a first human (201) enters the structure. This individual is detected in the hallway (105) as shown in FIG. 1B, and at this time the central controller (107) knows that some environmental control needs to be activated to deal with expected occupancy. However, from FIG. B, it may not be apparent which room (101) or (103) to activate the control in as it is unclear which office (101) or (103) belongs to the first human (201). Because of the uncertainty, the central controller (107) may simply activate both systems (301) and (303) or may initiate a query to the first human (201) using a voice response system (109).

As shown in FIG. 1C, the first human (201) has entered the first room (101) and ceased moving. The system therefore shuts off the system for room (103)(if it had turned it on) and increases the power to room (101) as the human has now been determined to be occupying room (101) and does not appear to be leaving soon. In addition, as the structure is now occupied, the system also activates the environmental control to the common area, hallway (105).

At a further time, as illustrated in FIG. 1D, a second human (203) is detected in the hallway (105). The system (101) presumes that this is the occupant of the second office (103) as the first office (101) is already occupied and activates the environmental controls in the second office (103). There is no need to activate the environmental control (305) for the hallway (105) as it is already under activated environmental control due to the presence of the first human (201) in the structure. As opposed to what is expected, the second user (203), however, also goes into the first room (101) as shown in FIG. 1E. While this is unusual, the system (100) would know that one of the humans (201) and (203) will likely soon go into the second room (103). The system may therefore initiate environmental controls in the second room (103) but allow them to run at a lower power level. The second human (203) does go into the second room in FIG. 1F. In this scenario, the system (100) may respond by increasing the environmental change in the second room (103).

At a much later time, the office is getting ready to close. At this time the second human (203) leaves room (103) and goes into room (101) as shown in FIG. 1G. In this scenario, the central controller (107) does not shut off the environmental control to room (103) as it is not yet clear if person (203) is leaving. However, as shown in FIG. 1H, the person (203) does go into the hallway (105) and depart the structure. Upon person (203) leaving the structure, the system (100) will shut down the environmental control to room (103) and allow the conditions to begin to return to ambient in room (103).

In FIG. 1I, the first human (201) gets up and goes to room (203). Because the human (201) is not expected to remain here, the system (100) may not adjust the control of room (201) or (203). However, as shown in FIG. 1I, the person (201) has remained in room (203) for a period of time. At this time, it is now unclear if person (201) or person (203) actually left in FIG. 1. Due to the lack of clarity, the system (100) may utilize the voice unit (109) to query person (201) if they intend to remain in room (203). In this scenario, the answer is in the negative. Based on the answer, the system (100) makes no alteration to the current environmental control.

In FIG. 1J, the person (201) enters the hallway (105) and leaves the structure. The system (100) can now determine that there are no persons in the structure any longer and shuts down all the environmental controls (301), (303), and (305) returning the system to the state of FIG. 1A.

In this very simple example a few key points can be illustrated. The first is that the system can alter controls for specific areas of the structure based on occupancy. Specifically, traditional systems would have been unable to activate the second room's (103) controls while the first human was in the hallway and then deactivate them when the first human went and stayed in the first room. The traditional system would have activated either both or neither from the hallway detection. Further, a traditional system would have been unable to detect the departure of only person (203) from the first room and only shut down the controls (303) to room (103). Finally, a traditional system would have been unable to query the person (201) in room (103) as to if they were actually going to remain there.

While this simple example shows just two users and two rooms, it should be apparent that in a large structure with multiple occupants (such as a large commercial office building) this type of granular control can be repeated over and over for each individual human detected in the structure. Further, the system can provide additional functionality. Take for Example FIG. 2, where there are now a large number of human's in the first room (101) and it is likely heating up quickly due to their presence. If an NPS system detects a large influx of people into a space, it could prompt via a voice recognition input asking if a human (201) would like to adjust the thermostat to account for the increased occupancy or could simply do so to maintain a fixed temperature in the room (101). It may even do this while not adjusting the temperature in the second room (103) or it may draw power away from the environmental control (303) and/or (305) to additionally power control (301) as there is currently no one detected in room (103) or hallway (105). This, for example, could allow the system to automatically detect a meeting in room (103) and move resources to the meeting room (103) away from other space (101) and (105). Such shifting of resources can avoid overloading environmental systems on days where there is particularly high demand in certain areas.

Similarly, the system could ask for instruction if a human was moving around a great deal within the space or was detected at an odd hour. The system could request instructions if the user would like to control the HVAC system for all the areas they are in or only some of them, or if they are not planning to occupy the space for a large enough period of time to justify turning the system on.

As should be apparent from the above examples, by being able to detect the presence of a human, multiple humans, or a specific human within the space, and to detect changes in patterns of occupation, the HVAC system does not need to simply turn on and off, but can request instruction, or simply alter operation, based on the circumstances of the occupancy. Thus, increased occupancy can result in a different query or operation than an odd-hour occupancy, which can result in a still different inquiry (or no inquiry at all) if the occupancy is what is expected. The key to all the above is that detection of actual occupancy allows the system to initiate communication to the human user in a way that has not previously been available or to react based on a non-binary decision.

Another example integration would be that an NPS system can notify an HVAC system as to whether a structure is occupied or not at the level of an entire space. This may be provided based upon the presence detection level or functionality, but may additionally be estimated based upon a change detection type system integrated with the NPS system. A change detection system operating over an entire structure may be used as an NPS system because most structures only have a few access points from the outside world. In this way, it would be possible to limit the system (100) to changing state only when changes are detected in spaces with access to the outside world. Further, such a system (100) may be programmed to query users in those spaces, using voice or other means, as to if and when they intend to exit the structure. It may further be possible to query if they are leaving the structure unoccupied, to avoid any issues with other sleeping/static occupants if they cannot be detected for some reason.

Using the true presence detection level of functionality, it is possible to tell an environmental system not only whether a structure is occupied or not, but how much occupation is occurring and where it is occurring within the structure. Such data may be integrated into a mixed proactive/reactive system, where such a system may predict the presence or absence of a human in a particular location based on historical data, while additionally reacting to detected changes under normal operations. For example, it may determine that typically a structure is empty from 8 pm until 6 am but that the structure has a slow influx and outflux of individuals leading up to those times. This would be typical of an office building during a weekday. From that, the system can form a typical schedule around such information and adjust environmental controls to maintain a near constant temperature over the window of occupancy including appropriate lead-up to occupancy and fall-off of occupancy.

Should someone have a day off and stay home, such a presence system may detect that the structure is less occupied or that specific areas (for example a specific office) is unoccupied, allowing the environmental system to react accordingly. Similarly, such data would allow a system to adjust to people arriving later in the morning, but also to people leaving for home later, such as if an office party kept more employees late a certain day.

Such a system can also be used in a complementary fashion in a home. The system could prepare for a home arrival by achieving a temperature a few degrees away from desired, as distinct from the deep setback when the structure is predicted to be empty, and simply adjust the last few degrees when occupancy is detected.

Furthermore, should occupancy for an entire structure be determined, it would be possible for the environmental system to more appropriately respond to the number of persons present. Such an action would be particularly useful during summers when environmental systems often struggle to cope appropriately with large gatherings and are often set very low to cool the structure to an uncomfortably low temperature prior to the group's arrival. By estimating that occupancy of the structure is getting larger, such a system may be able to react more intelligently to such demands compared with how such a system would respond without the knowledge provided by an occupancy count estimate.

Another example integration would be with a room by room environmental system, with one or more possible improvements to such a system being possible with a network presence sensing system. Generally speaking, these are similar to those which are possible on a whole structure basis, but providing additional benefits depending on the level of functionality provided by the system (100). This benefit becomes greater when each room is additionally associated with some determination of occupancy count. Looking at the pure occupancy case, it is possible to build use cases wherein occupied rooms are maintained at an appropriate temperature while unoccupied rooms are allowed a greater level of temperature fluctuation, such as to allow for power draw adjustment and reduce the overall draw of a structure over time. Further, in systems where individual spaces may be activated and deactivated, savings may be achieved through such means.

Providing such a space with an estimated count of the number of people inside provides additional opportunities for systems. In a structure, it may allow for the user to better adjust the manual vents to accommodate areas being used, or an automated system may better handle dynamic loading of various rooms. In a commercial setting, the number of people in a space allows for a variable air volume (VAV) system to adjust airflow according to the number of people present.

As should be apparent, the ability to detect presence in this circumstances cannot be reliant on fiducial identification of humans. If the system wants to detect that multiple humans are present in the space, the ability to detect the fiducial element of the translator of the user is useless as likely only one human could ever be identified unless they were specifically associated with the system (100). Further, fiducial elements in the space do not necessary tell a complete story. Even if the system (100) could detect every smartphone in the space, the system (100) may not have an accurate count of occupancy. For example, a user may leave a smartphone in their office on a charger when they go to a firm party as they know they will not need it and do not want to have the possible distraction it presents. This inaccurately positions the person in the building and would result in temperature being maintained in their office, and their load in the conference room not being taken into account.

From a security standpoint to make sure that the person is authorized to alter environmental controls, if a request for information was made by the system a system (such as in FIG. 1I) the system (100) could automatically arm when a space (e.g. room (103)) has been fully emptied, and prompt for some form of pass phrase when presence is detected while such a system is armed. The passphrase may be recognized as a password, or in other embodiments may be a direct result of a voice print from a person or from the detection of the system that the particular authorized individual is in the room. For example, an office may have the environmental system deactivated when the known office user leaves the entire structure. Thus, if an assistant was to enter the office to drop off some papers, the assistant would not cause the environmental system in the office to startup again as they are likely not remaining in the office for any period of time or a query may be presented to see if they intend to stay in the office.

Inferred presence may also be added to the system through third party interactions with the system, including but not limited to switch actuation, contact sensors, third party motion detectors, human reaction to system changes, etc. Such inferred presence may serve as additional training information for the system (1M) or assist the system (100) in making sure it has an accurate count of occupancy and presence.

While environmental and comfort control is one way in which presence sensing can provide for dramatically improved communication and machine interpretation, another interesting application is in the security realm. Security systems typically require identification of individuals, and generally making sure that specific individuals are where they are allowed to be, and not where they are not allowed to be.

Use of fiducial elements present a major concern for security in a secured structure but they are near ubiquitous out of necessity. In a first instance, fiducial elements may simply be lost or stolen, posing a gaping security hole. Even in the event that fiducial elements are sufficiently secured themselves to provide increased likelihood of proximity to only the authorized human, the need to correctly cancel fiducial elements from a system (such as at termination of an employee) can still be great and "faked credentials" will always exist if there is a reason to want to use them.

Presence sensing can provide for a drastically improved security mechanism as it allows for electronic security systems to actually locate target humans. Even if humans cannot be individually distinguished by the system at an individual level (e.g. the system knows there is one human, but not who it is), the ability to detect the presence of a specific number of humans within spaces provides for a much more rigorous security system. Previously, fiducial elements were only generally used (and required identification) when the element passed between spaces (e.g. it controlled the lock to a door). With presence sensing the location of humans can be determined even when that location is static (not moving or transitioning between spaces). Thus, a door could now sense if a second human enters behind a first authorized one or if an individual seems to be moving in a path that is not authorized.

From a whole structure perspective, the systems and methods discussed herein can determine currently occupied spaces, and upon arming the system only allow occupancy transitions from adjacent spaces, flagging new entrants as possible intruders into the system if there is a determination of a presence in a space that had not been previously detected in an adjacent space. In this way, it would be possible to have the entire structure covered by security, while allowing normal occupancy within the structure without need for a user to present a scan card or similar fiducial element translator to pass through a doorway.

In a home setting, the system could be armed when occupants are in their bedrooms, and track them as the move around the home. Should a new detection be made in an exterior facing area where there was not previously presence, the system could trigger an alert; however, an occupant from within the home entering any space from an adjacent area would be normal and not trigger the alarm. This provides the system with the ability to act as intelligent security system for the home when armed, even with occupants being in the home and the system's armed nature being transparent to them.

Such a system could work on adjacency principles (that humans will always move along an unbroken path), or on an overall count of people in the home. Changes to the count could signal an intruder, or at the very least prompt for a pass phrase. Such a system would go beyond the state of the art in a normal security system by providing whole home coverage while occupied, something that is impossible with traditional motion detector based technologies in in most security systems since they operate in a binary mode related to detection of any human or detection of no humans.

Integration of NPS data on whole home scale allows for interesting localization integrations, particularly as they relate to triggered events for home automation type scenarios. By way of example and not limitation, if a home is integrated with a system (100) and a user would like to flash the lights when the doorbell is rung, it would be possible to localize the lights to be flashed only in the room in which that person is present. Further, a hearing-impaired person could be provided localized alerts for items such as phone calls without having to carry any hardware with them because the system (100) knows where they are and without the specialized alerts being provided to any other occupant. Thus, an alert for an incoming call could simply flicker the smart lights in an occupied space as opposed to in an entire house.

Location based data could additionally be used at the home scale for proximity marketing opportunities, possibly asking occupants if they want to add anything to the grocery list because they're in the kitchen, recommending television programs when in the living room, or providing coupons/suggestions for things to do on the weekend when entering certain rooms. Further, third party organizations may harvest anonymized location data correlated with purchasing trends to try and unlock purchase patterns for those that use their structures in certain ways. For example, are people more likely to order products from a mobile device while sitting at a table, on a couch, or in bed. Such activities may provide market insights which could be used to enhance product and advertising offerings based on structure usage patterns.

As an example, people who spend a lot of time in bed on a given day may be offered medication to get over being sick, while homes which have one less person during the week may offer various travel specials to its occupants. In essence, the integration of network presence sensing alongside voice recognition provides another opportunity for data collection and advertising based on that data which would have not been previously possible. Such features may be opt-in or default on depending on the integrator of the technology. Voice recognition and audio based interactions provide a new medium to apply such advertising which is enabled using network presence sensing technology.

Another potential interaction is for the system to recognize that a home is empty when it is expected to be occupied, particularly for a longer period. Such a situation could indicate a family has gone on vacation, for instance, and the system may attempt to contact a family member to let them know that lights were left on or that the garage door is still open. Similarly, if a system detects that a previously occupied structure is no longer occupied, a stove may be turned off to reduce or eliminate a potential fire hazard. In a related situation, for an individual with known memory problems, the system detecting the individual leaving the residence could initiate a prompt instructing them not to leave and if it is not followed, take defensive action such as notifying caregivers and eliminating any danger scenarios that now exist in the residence such as shutting off potentially hazardous devices within the home.

In sum, the ability to detect presence can allow a system controlling various smart "objects" in a home to "intuit" that the present scenario in the home may not correspond to what is expected given the current human presence. This can then trigger an inquiry initiated by the system to the human users that has not previously been possible, or allow the system to simply react without human instruction. In all of these scenarios the key is that the system is detecting that the human presence detected does not correspond to the human presence expected for the particular mode or operation that the system is currently operating in.

Another example integration includes causing certain interactions based on occupancy given the presence of a fire alarm or other emergency situation. Such situations may include flashing the lights or changing their color to signify a fire, illuminating paths out of buildings based on room occupancy at the time of a fire and turning off lights in spaces which have been cleared. In an embodiment, the system could even detect that a presence has remained in a location even though such person would clearly have known there is a fire and the system can initiate direct communication to them or direct emergency crews to that location on the expectation the person may be trapped or injured. Similarly, detection of presence of an individual moving in an erratic fashion (e.g. back and forth) may indicate that they are trapped or cannot locate an exit and the system may initiate additional communication. In short, the building could respond in a fashion in a time of crisis based upon the actual needs of human occupants based on their location within the structure. Such a system could dynamically route people in the building around the areas where the fire has been detected allow for much more personalized escape plans.

Another example integration includes integrating exterior door locks based on occupancy data, possibly integrated with time of day. In such a scenario, it would be possible to have door locks engaged in the event a home is empty, and only allow locks to disengage in the event that a person is present within a room adjacent to those locks. Further, automatically locking the door when the home is no longer occupied is also a possibility. Such a system could keep the home secure while appearing transparent to the user when using the system allowing them to come and go from a secure house without them needing to lock the doors.

Another example integration would be to perform room by room security, where certain rooms can be entered only under certain conditions allowing access control to individual spaces in a home. For example, if children are supposed to stay out of their parents' bedroom unless the parents are there, and the parents' bedroom is currently unoccupied, a detected occupancy could prompt for a passphrase, and if an appropriate one is not entered the system could alert the parents that an unauthorized access has occurred including the time of the unauthorized access. However, if there is already someone in the parents bedroom, the additional occupancy could be allowed without concern.

Another example integration would be to allow for whole home style outlet control, where if a home is not occupied then selected smart outlets could be commanded to turn off. This could significantly reduce the so-called vampire loads associated with leaving chargers plugged in during the day when nobody is home and the devices are not being used for charging. The reason for making this a whole home occupancy relationship rather than a room by room relationship would be for charging devices in other rooms. Thus, charging a smart device in the kitchen while sleeping would work, but such a device would not be charging, or powered of, during the day when nobody is present in the home. With energy monitoring within the outlets, it would be further possible to detect the load going through a given outlet and decide whether such a load should be allowed when nobody is in the home. This could provide benefits including but not limited to: energy savings and fire hazard reduction.

Another example integration would be to allow mobile devices or other computers communicating with the network to exist not only as additional nodes on a communication network, but additionally as both inferred inputs as well as possible voice input locations for the system. Since many computing devices contain wireless communication devices, such wireless communication devices can act as nodes within a wireless communication network providing network diagnostic information to perform detections. Further, the presence of a person may be inferred through interactions including but not limited to typing, clicking a human interface device, or interacting with a touchscreen. Beyond inferred presence, such devices are often coupled with a microphone or other audio listening capability. As such, a personal computer could be utilized as another voice recognition system, prompting for a passphrase for a security system as described herein or otherwise allowing the voice recognition system to respond based upon presence flags.

Another example integration would be to allow the system (100) to share occupancy count information with other systems, allowing for further possibilities with regards to responding to people in a space. By way of example and not limitation, it may be possible to suggest when a room (or an elevator) is getting too full by flashing the lights, operate in a security mode based upon the current occupancy level of a home, notify a hospitality system of how many people have used a space, or limit further entry into a space by way of a controlled access point. Further, a user of a system could query for current occupancy levels, providing them access to information about the occupancy of a space with a simple voice command. Such a voice recognition system could further be programmed to notify incoming occupants of the current occupancy level automatically, letting them know if they are entering an occupied space. Such information could also be used socially to allow a person to know an expected need to wait to enter a restaurant, club, or bar based on occupancy levels in the structure or in a space designated for waiting outside the structure.

Other example integrations may be possible with knowledge that an individual is alone in a space. With such knowledge, a voice recognition system may interact securely with an individual upon the identification of the individual. Such interactions may relate to private events, gill giving, quiet reminders, etc. depending on the preferences of the user of such a system. Further, they could allow for improved security when entering payment (e.g. credit card) information into the system. Such identification may be done using more advanced features of a system (100) which identifies a given user based upon their specific impact on a wireless communication network or through the voice recognition system. Such identification may be confirmed via passphrase or voice print. Such a system may proactively prompt the user for such information by triggering from a network presence sensing system. Alternatively, a user may query a voice recognition system, which may respond with the fact that they are alone in case they want to query for specific information.

While the invention has been disclosed in conjunction with a description of certain embodiments, including those that are currently believed to be preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for altering an environment in a structure based on occupancy, the method comprising:
    detecting a first human in a common space in a structure;
    determining that said first human has moved from said common space to a first space adjacent said common space in said structure by detecting said first human's presence in said first space using network presence sensing (NPS), said first human's detected location not corresponding to the location of a fiducial element carried by said first human acting as a proxy for said first human;
    instructing an environmental control system to alter an environment within said first space and in said common space based on said first human's location in said first space;
    tracking movement of said first human from said first space to a second space adjacent said common space said tracking using NPS and not corresponding to tracking the location of a fiducial element carried by said first human acting as a proxy for said first human; and
    instructing said environmental control system to alter an environment within said second space without altering said instructing of said environmental control system in said common space based on said first human being in said second space and not in said first space.

2. The method of claim 1 further comprising instructing said environmental control system to alter an environment within said first space based on said first human being in said second space.

3. The method of claim 1 further comprising instructing said environmental control system to alter said an environment within said second space without instructing said environmental control system to further alter said environment in said first space based on said first human being in said second space.

4. The method of claim 1 wherein upon said first human entering said second space, a voice response system issues a query audible in said second space but not in said first space.

5. The method of claim 1 further comprising:
    tracking movement of said first human from said second space to said first space within said structure said tracking using NPS and not corresponding to tracking the location of a fiducial element carried by said first human acting as a proxy for said first human; and
    instructing said environmental control system to alter an environment within said second space without instructing said environmental control system to alter an environment in said common space based on said first human returning to said first space.

6. The method of claim 5 wherein said instructing to alter based on said first human returning to said first space occurs before said instructing to alter based on said first human being in said second space.

7. The method of claim 1 wherein said instructing to alter based on said first human being in said second space is only executed after said first human has remained in said second space for a predetermined period of time.

8. The method of claim 1 wherein said first human is one of a group of humans detected to have moved from said common space to said first space.

9. The method of claim 8 further comprising instructing said environmental control system to alter an environment within said first space based on said group of humans being in said second space.

10. The method of claim 8 further comprising instructing said environmental control system to alter an environment within said first space based on said group of humans being in said second space.

11. The method of claim 1 wherein said first human is one of a group of humans detected to have moved to said second space.

* * * * *